UNITED STATES PATENT OFFICE.

BERNHARD ROCHOW, OF NEW YORK, N. Y.

MEDICINAL SOAP.

SPECIFICATION forming part of Letters Patent No. 505,847, dated October 3, 1893.

Application filed March 30, 1893. Serial No. 468,370. (No specimens.)

*To all whom it may concern:*

Be it known that I, BERNHARD ROCHOW, a citizen of the United States, residing at New York, in the county and State of New York, have invented a certain new and useful Medicinal Soap for Toilet, Bathing, and Medicinal Purposes, of which the following is a specification.

My composition consists of the following ingredients, combined in the proportions stated, viz: pure (etching-lye of soda) tallow soap, twelve ounces; white wine, nine ounces; olive oil, 4.50 ounces; camphor-gum, .75 ounce; oil of rosemary, .25 ounce; oil of lavender, .50 ounce.

In preparing my improved composition, I take twelve ounces of pure (etching-lye of soda) tallow soap, containing at most twelve per cent. of water, and place the same in a vitreous earthen-vessel. I then place in the same vessel, with the tallow soap, nine fluid ounces of white wine. I then dissolve the tallow soap in the wine, by applying thereto a gentle heat until it becomes of the consistency of a thick pap, taking care to stir the ingredients named during the application of heat. I then add three and three-quarter fluid ounces of olive oil, continuing the application of heat and taking special care that the contents of the vessel do not boil, until the same becomes of the consistency of a thin pap; whereupon I discontinue the use of heat, and allow the mass to cool sufficiently that it will not burn the finger when placed therein. I then dissolve three-fourths of an ounce of camphor-gum in three-fourths of an ounce of olive-oil, one-fourth ounce of oil of rosemary, and one-half ounce of oil of lavender, and add the resultant solution to the mass aforenamed. Now, upon being allowed to cool, the composition is ready for use, and may be cut into cakes of any desired form. The composition should be kept carefully wrapped in some suitable covering, to prevent evaporation thereof.

I am aware of the fact that most of the ingredients hereinbefore named have been heretofore used in medicinal soap mixtures, and I do not claim them separately, but only when combined as herein stated. I further wish to state that the dissolving of tallow-soap in white wine, and then adding olive-oil,—that is, not allowing the olive-oil to be saponified, is an entirely new feature, peculiar alone to my improved composition. The olive-oil, when not saponified will, in combination with the white wine, give an effective vehicle for spreading the particles of camphor-gum over the skin, and at the same time covering it with a layer of oil, which will prevent the user from taking cold. Furthermore, the proportions of olive-oil and camphor-gum are so chosen that any material deviation therefrom would render it impossible to obtain the desired effect in diseases like rheumatism and hip-gout; and this statement I base on my personal experience during a practice as a physician of thirty years. The addition of rosemary-oil and oil of lavender, small as the quantities are, is made to stimulate the skin and prepare it for the combined effects of the oil, wine and camphor.

My improved composition is to be used as ordinary soap, and possesses value not only as a toilet article, but as an efficacious remedy in the cure of rheumatism and cutaneous diseases, and as a reliable disinfectant.

I claim as my invention—

The herein described new composition of matter, consisting of pure (etching-lye of soda) tallow soap, white wine, unsaponified olive oil, camphor-gum, oil of rosemary, and oil of lavender, combined in the proportions substantially as herein set forth.

BERNHARD ROCHOW.

Witnesses:
JACOB BACHRACH,
ALFRED KOECHLI.